(12) United States Patent
Zacarias et al.

(10) Patent No.: US 7,955,540 B2
(45) Date of Patent: Jun. 7, 2011

(54) EXTRUSION OF THERMOPLASTIC ELASTOMERS

(75) Inventors: Felix M. Zacarias, Akron, OH (US); Rachna Mohan, Solon, OH (US); John Bowers, Mogadore, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 379 days.

(21) Appl. No.: 11/655,454

(22) Filed: Jan. 19, 2007

(65) Prior Publication Data
US 2008/0174042 A1 Jul. 24, 2008

(51) Int. Cl.
  *B29C 47/12* (2006.01)
(52) U.S. Cl. .......... 264/177.16; 264/177.1; 425/461
(58) Field of Classification Search .......... 264/177.1, 264/177.16; 425/461
  See application file for complete search history.

(56) References Cited

U.S. PATENT DOCUMENTS

| | | | | |
|---|---|---|---|---|
| 3,382,535 A | * | 5/1968 | Ferrari | 425/461 |
| 3,751,209 A | * | 8/1973 | Schreiber | 425/461 |
| 3,994,654 A | * | 11/1976 | Chyu | 425/461 |
| 4,282,177 A | | 8/1981 | Kurtz et al. | |
| 4,392,808 A | * | 7/1983 | Phillips | 425/464 |
| 4,540,753 A | | 9/1985 | Cozewith et al. | |
| 4,960,375 A | * | 10/1990 | Saito et al. | 425/131.1 |
| 5,089,200 A | * | 2/1992 | Chapman et al. | 264/127 |
| 5,156,790 A | * | 10/1992 | Cucchisi et al. | 264/176.1 |
| 5,169,589 A | * | 12/1992 | Francoeur et al. | 264/323 |
| 5,417,907 A | | 5/1995 | Ohhata et al. | |
| 5,656,693 A | * | 8/1997 | Ellul et al. | 525/171 |
| 6,533,565 B1 | * | 3/2003 | Guillemette | 425/113 |
| 6,720,376 B2 | | 4/2004 | Itoh et al. | |
| 6,867,260 B2 | | 3/2005 | Datta et al. | |
| 2004/0038018 A1 | * | 2/2004 | Anderson et al. | 428/304.4 |
| 2004/0236042 A1 | | 11/2004 | Datta et al. | |
| 2005/0245679 A1 | * | 11/2005 | Ajbani et al. | 525/66 |
| 2006/0100347 A1 | * | 5/2006 | Ouhadi et al. | 524/502 |
| 2006/0128907 A1 | | 6/2006 | Yu | |
| 2007/0066797 A1 | * | 3/2007 | Ohmi et al. | 528/499 |

FOREIGN PATENT DOCUMENTS

| | | |
|---|---|---|
| EP | 0302621 | 11/1993 |
| EP | 0 436 724 | 9/1995 |
| EP | 0 911 364 | 4/1999 |
| EP | 1 550 693 | 7/2005 |
| JP | 2001-073164 | * 3/2001 |

(Continued)

OTHER PUBLICATIONS

Jessie D. Gander, et al.; "Review of Die Lip Buildup in Plastics Extrusion"; *Polymer Engineering and Science*, Vo. 37, No. 7, pp. 1113-1126, Jul. 1997.

(Continued)

*Primary Examiner* — Richard Crispino
*Assistant Examiner* — Robert Dye
(74) *Attorney, Agent, or Firm* — Kevin M. Faulkner

(57) ABSTRACT

A method of forming a thermoplastic vulcanizate by first providing a melt-blender having a die through which melt-blended thermoplastic vulcanizate passes to form a shaped article; wherein the die comprises a flow design having at least one flow branch having a taper angle and a flow reservoir at the end of each flow branch; and wherein the taper angle of the flow design ranges from 5 to 20 degrees; followed by melt-blending a thermoplastic and an elastomer with an organic peroxide curative in the melt-blender to form a thermoplastic vulcanizate; and finally, passing the melt-blended thermoplastic vulcanizate through the flow design to form the shaped article.

19 Claims, 2 Drawing Sheets

FOREIGN PATENT DOCUMENTS

| WO | WO 2005/028555 | | 3/2005 |
|---|---|---|---|
| WO | WO2005021227 | * | 10/2005 |

OTHER PUBLICATIONS

Rauwendaal, C. et al., "1. Requirements for Efficient Troubleshooting." and "3.7.2 Die-Lip Buildup ("Die Drool")." in Rauwendaal, C. et al., *Troubleshooting the Extrusion Process—A Systematic Approach to Solving Plastic Extrusion Problems* (Cincinnati, Hanser, 2001), pp. 1-5 and p. 102.

Wortberg, J. *Screw and Barrel Design for Grooved Feed* vs. *Smooth Bore Extruders Society of Plastic Engineers-ANTEC*, San Francisco, 2002, pp. 1-5.

G. Ver Strate et al., "*Near Monodisperse Ethylene-Propylene Copolymers by Direct Ziegler-Natta Polymerization. Preparation, Characterization*, Properties", Macromolecules, 1988, vol. 21, pp. 3360-3371.

S. Abdou-Sabet et al. "*Dynamically Vulcanized Thermoplastic Elastomers*", Rubber Chemistry and Technology, 1996, vol. 69, No. 3, pp. 476-494.

* cited by examiner

EXTRUSION OF THERMOPLASTIC ELASTOMERS

FIELD OF THE INVENTION

The present invention relates to methods of forming thermoplastic vulcanizates, and more particularly, to methods of melt blending and extruding thermoplastic vulcanizates that are cured using peroxide cure agents.

BACKGROUND

In the extrusion of peroxide cured thermoplastics and thermoplastic elastomer compositions an accumulation of material often appears at the face ("front") of the die. This accumulated material is often referred to as die "drool" or die "mustache". Die lip buildup (or "mustache") poses a significant problem for extruder operators. An effort to describe the causes of die lip buildup in conventional thermoplastic extrusion is made by Jessie D. Gander and A. Jeffrey Giacomin in "Review of Die Lip Buildup in thermoplastics Extrusion" 37(7)POLYMER ENGINEERING AND SCIENCE (July, 1997). Though this reference refers to thermoplastics extrusion, it is believed to be an apt reference with respect to the cause of die mustache in thermoplastic vulcanizates ("TPV") upon extrusion. The shape, and more specifically, the consistency of the shape, imparted to the molten TPV as it passes through the extruder die is dependant on the smoothness of the die at its mouth. The presence of material deposits or buildup at the mouth of the extruder die can affect the shape of the die mouth. Additionally, deposits may impart unwanted grooves on the extrusion as the deposit digs into the surface of the molten extrusion. Finally, deposits may, from time to time, slough off of the die lip and onto the TPV extrusion, creating an unwanted bead or glob on the extrusion.

Methods to reduce die mustache have generally produced unsatisfactory results, either in the total reduction of die lip buildup, or in the overall physical properties of the resultant TPV. Two approaches are described in EP 0 911 364 A1 and EP 1 550 693 A1. In the first reference, a process for making a TPV is described that involves adding a portion of the total polyolefin thermoplastic to the TPV composition after the elastomer curing agent has been added to the extrusion chamber and the elastomer has been substantially cured. This approach requires extra extrusion steps and is thus not desirable. In the latter reference (EP 1 550 693 A1), syndiotactic polypropylene is substituted for isotactic polypropylene as the preferred polyolefin thermoplastic. While reduced die buildup is claimed, the resultant TPV has poor compression data at the extrusion temperature.

Other references of interest include EP 0 436 724 A1 and U.S. Pat. No. 6,720,376.

It would be desirable to provide a method of forming thermoplastic vulcanizates that result in a reduction of die mustache as compared to conventionally formed TPVs while maintaining other physical properties.

SUMMARY

One aspect of the present invention is directed to a method for extruding a thermoplastic vulcanizate, the method comprising:

(a) providing a melt-blender having a die through which melt-blended thermoplastic vulcanizate passes to form a shaped article; wherein the die comprises a flow design having at least one flow branch having a taper angle and a flow reservoir at the end of each flow branch; and wherein the taper angle of the flow design ranges from 5 to 20 degrees;

(b) melt-blending a thermoplastic and an elastomer with an organic peroxide curative in the melt-blender to form a thermoplastic vulcanizate;

(c) passing the melt-blended thermoplastic vulcanizate through the flow design to form the shaped article.

The various embodiments described herein can be combined with other aspects of the invention.

DETAILED DESCRIPTION

As used herein, "melt-blender" refers to any type of apparatus that is capable of blending materials such as thermoplastics (e.g., polyethylene, polypropylene, etc) and elastomers (e.g., ethylene-propylene-diene rubber, butyl rubber, etc) by imposing enough sheer to melt the materials and create a blend of the materials. Examples include single and twin-screw extruders, so-called mega extruders, Brabender melt mixers and the like.

As used herein, "die" refers to an orifice-containing element mounted at the end of an extruder, which gives the extrudate its final shape. Stated another way, the die is a component of a melt-blender that allows molten material to flow through a relatively small orifice or slit, the orifice or slit being shaped into the desired profile of the article to be made. The die comprises a "flow design", which refers to the shape and size of the overall orifice or slit through which molten material can flow to be formed into a shaped article. The flow design in one embodiment of the present invention possesses at least one "flow branch" and a "flow reservoir" located at the end of each flow branch. Each flow branch possesses a taper angle of between 5 and 20 degrees, more preferably between 8 and 16 degrees, and even more preferably between 9 and 14 degrees. The taper angle is defined by the difference in the openings of the flow design from the die front (smaller) to the die back (larger). These features may be more apparent by reference to the figures.

The flow reservoir is characterized in that it is larger in size on the die back side of the die, but tapers to the same size as the surrounding flow branch on the die front. Thus, an area of greater volume of molten material can flow into the flow reservoir relative to the other portions of the flow design.

Figure 1:
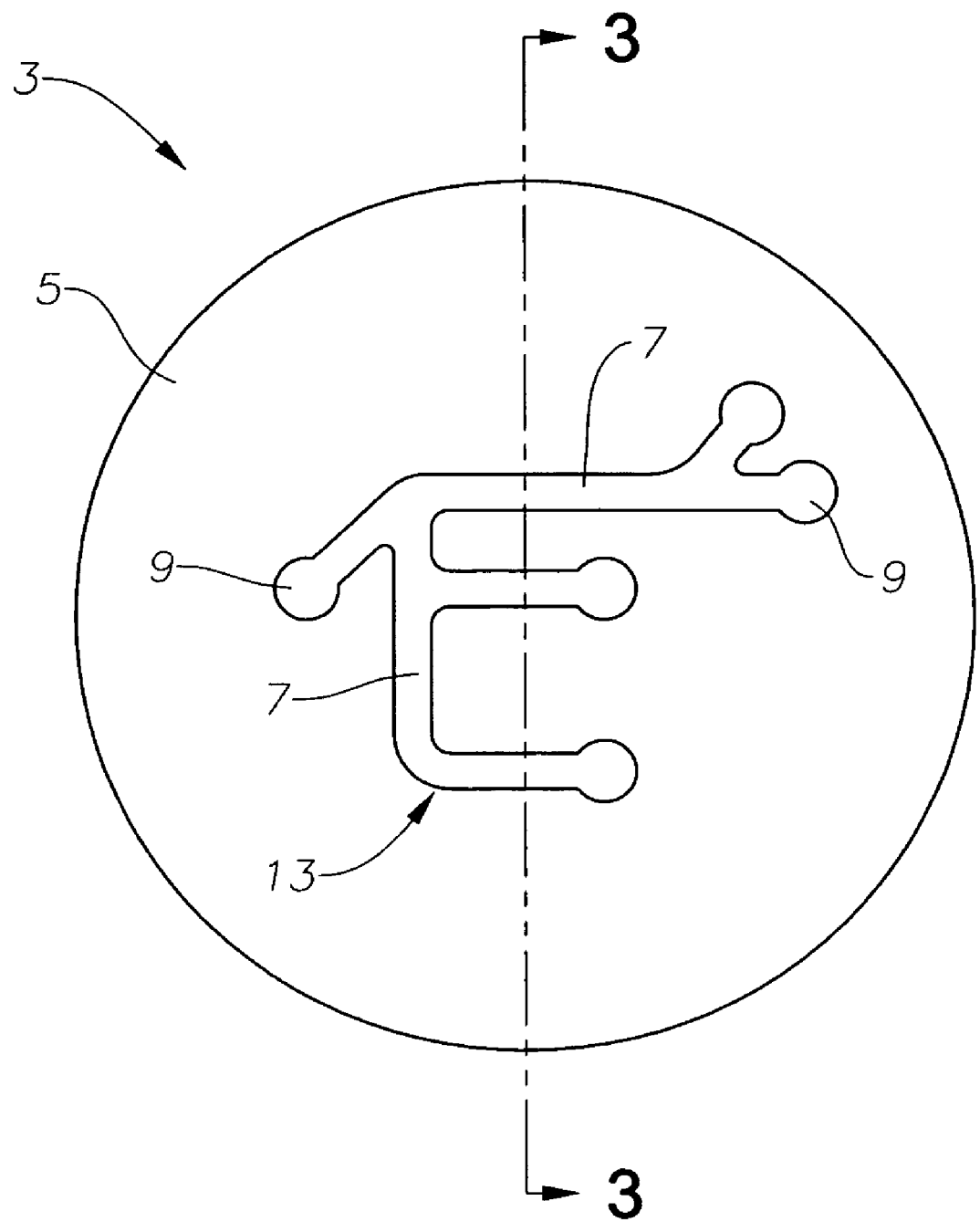
FIG. 1 is a face-on drawing of the back face of an exemplary die, the dotted line referenced to the cutaway view in FIG. 3.
Figure 2:
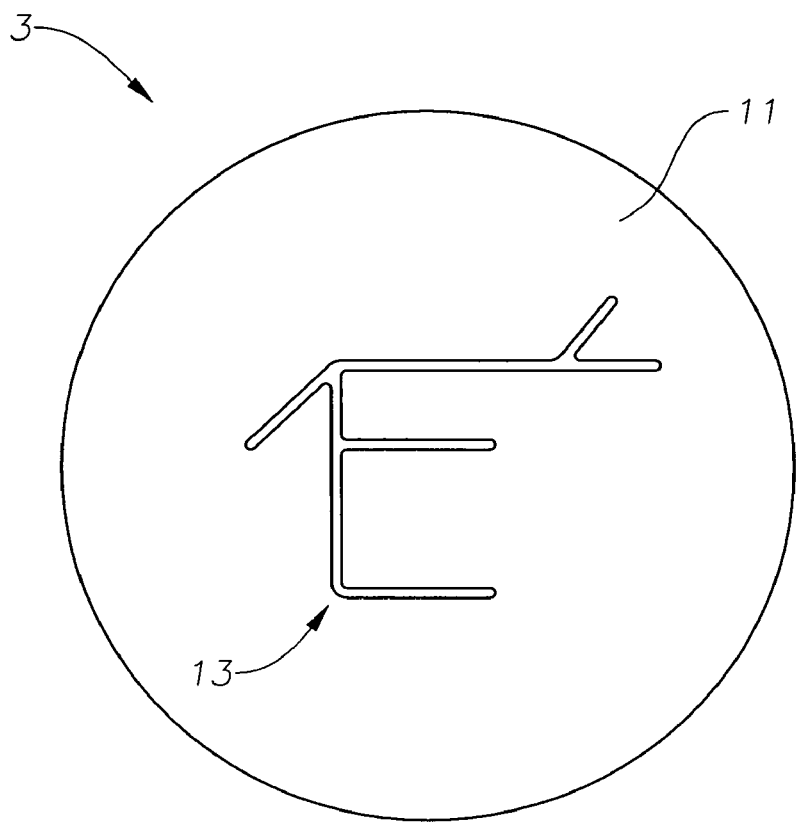
FIG. 2 is a face-on drawing of the front face of the same exemplary die, wherein the flow design is co-continuous from the die front to the die back, there being a taper angle defined by the increasing size of the orifice or slit.
Figure 3:
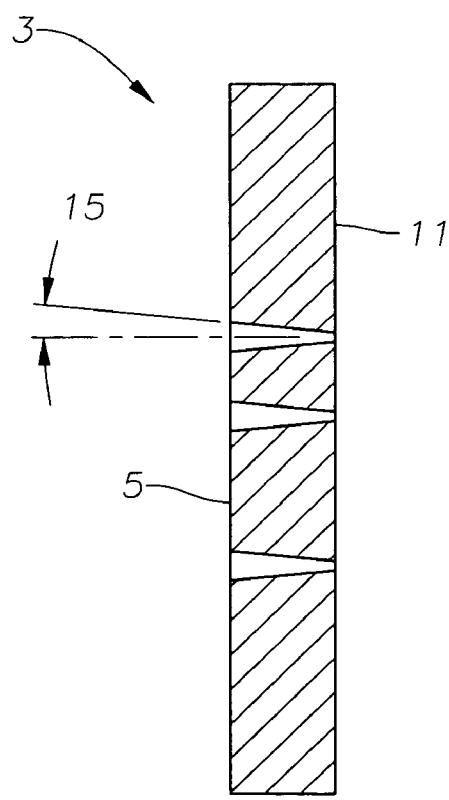
FIG. 3 is the cutaway view of the die as described in FIG. 1 showing the taper angle.

These features of the die can be described in one embodiment with reference to the figures. FIG. 1 is a back view of an exemplary die 3, wherein the die back 5 is flat and flush with the openings described by the flow branch 7 and flow reservoir 9. The die back 5 faces the inside of the melt-blender (e.g., extruder) such that molten material would first contact the die back and by pressure be forced through the flow branch 7 and flow reservoir 9 and out the die front 11 shown in FIG. 2 through the flow design 13. The flow branch 9 is continuous with the flow design through the thickness of the die 3 and possesses a taper angle 15 as exemplified in FIG. 3.

Molten material thus flows through the flow design 13 from the die back 5 to the die front 11, forming a shaped article in the form of the flow design 13. In one embodiment, the die is coated with a passivating layer from 10 to 500 μm thickness, and from 20 to 100 μm thickness in another embodiment. The passivating layer can comprise any coating known in the art for such uses such as nickel, Teflon™, or combinations thereof.

A thermoplastic vulcanizate can be extruded by first providing a melt-blender having a die through which melt-blended thermoplastic vulcanizate passes to form a shaped article; wherein the die comprises a flow design having at least one flow branch having a taper angle and a flow reservoir at the end of each flow branch; and wherein the taper angle of the flow design ranges from 5 to 20 degrees; followed by melt-blending a thermoplastic and an elastomer with an organic peroxide curative in the melt-blender to form a thermoplastic vulcanizate; and finally, passing the melt-blended thermoplastic vulcanizate through the flow design to form the shaped article.

In one embodiment, the die is at a temperature of from 185 to 205° C., and from 185 to 200° C. in another embodiment, and from 190 to 205° C. in yet another embodiment, and from 190 to 200° C. in yet another embodiment.

The melt-blender may be any suitable instrument known in the art, such as a single, double, triple or more barrel extruder. In one embodiment, the melt-blender is a smooth barrel extruder. In another embodiment, the extruder is a single barrel extruder. In yet another embodiment, the extruder is a double barrel extruder, and in yet another embodiment the extruder is a multi-barrel extruder. In any one of these embodiments the extruder is preferably smooth barreled.

The blending is generally performed at a temperature not exceeding 400° C., preferably not exceeding 300° C. and more particularly not exceeding 250° C. The minimum temperature at which the melt blending is performed is generally higher than or equal to 130° C., preferably higher than or equal to 150° C. and more particularly higher than 180° C. The blending time is chosen by taking into account the nature of the compounds used in the TPV composition and the blending temperature. The time generally varies from 5 second to 120 minutes, and in most cases from 10 seconds to 30 minutes.

In one embodiment, the output of thermoplastic vulcanizate melt from the die ranges from 15 to 30 kg/hr, and ranges from 16 to 28 kg/hr in another embodiment, and ranges from 18 to 25 kg/hr in yet another embodiment.

In one or more embodiments, the thermoplastic vulcanizates are prepared by dynamically curing a rubber with a curing agent while the rubber is mixed with a thermoplastic polymer. The resulting composition includes a crosslinked or cured phase and an uncrosslinked phase. The crosslinked phase includes a crosslinked rubber, and the uncrosslinked phase includes a thermoplastic polymer.

Rubbers include those polymers that are capable of being cured or crosslinked by peroxides. Reference to a rubber may include mixtures of more than one rubber. Non-limiting examples of rubbers include olefinic elastomeric copolymers, butyl rubber, natural rubber, styrene-butadiene copolymer rubber, butadiene rubber, acrylonitrile rubber, butadiene-styrene-vinyl pyridine rubber, urethane rubber, polyisoprene rubber, epichlorohydrin terpolymer rubber, polychloroprene, and mixtures thereof. In one or more embodiments, olefinic elastomeric copolymers include ethylene-propylene rubbers, propylene-based rubbery copolymers, and ethylene-based plastomers.

A particularly preferred rubber is so called ethylene-propylene rubber. The term ethylene-propylene rubber refers to rubbery copolymers polymerized from ethylene, at least one α-olefin monomer, and optionally at least one diene monomer. The α-olefins may include, but are not limited to, propylene, 1-butene, 1-hexene, 4-methyl-1-pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. In the event that the copolymer is prepared from ethylene, α-olefin, and diene monomers, the copolymer may be referred to as a terpolymer or even a tetrapolymer in the event that multiple α-olefins or dienes are used. In one or more embodiments, a blend of at least two distinct rubbers is employed where a first rubber includes diene units deriving from 5-ethylidene-2-norbornene and a second rubber includes units deriving from 5-vinyl-2-norbornene. In yet another embodiment, the rubber includes a tetrapolymer including units deriving from both 5-ethylidene-2-norbornene and 5-vinyl-2-norbornene. In one embodiment, the elastomer is ethylene-propylene-diene rubber and is present from 10 to 50 wt % based on the weight of the final thermoplastic vulcanizate, and is present from 15 to 40 wt % in another embodiment.

In one or more embodiments, the ethylene-propylene rubber includes from 12 to 85% by weight, or from 20 to 80% by weight, or from 40 to 70% by weight, or from 60 to 66% by weight ethylene units deriving from ethylene monomer, and from 0.1 to 15% by weight, or from 0.5 to 12% by weight, or from 1 to 10% by weight, or from 2 to 8% by weight diene units deriving from diene monomer, with the balance including α-olefin units deriving from α-olefin monomer (e.g. $C_3$-$C_{10}$ olefins such as propylene). Expressed in mole percent, the terpolymer of one embodiment includes from 0.1 to 5 mole percent, or from 0.5 to 4 mole percent, or from 1 to 2.5 mole percent diene units deriving from diene monomer. In one or more embodiments, where the diene includes 5-ethylidene-2-norbornene, the ethylene-propylene rubber may include at least 1% by weight, in other embodiments at least 3% by weight, in other embodiments at least 4% by weight, in other embodiments at least 5% by weight, in other embodiments from 1 to 15% by weight, in other embodiments from 5% to 12% by weight, and in other embodiments from 7% to 11% by weight units deriving from 5-ethylidene-2-norbornene.

In one or more embodiments, ethylene-propylene rubber may have a weight average molecular weight ($M_w$) that is greater than 100,000 g/mole, in other embodiments greater than 200,000 g/mole, in other embodiments greater than 400,000 g/mole, and in other embodiments greater than 600,000 g/mole; in these or other embodiments, the Mw of the preferred ethylene-propylene rubber is less than 1,200,000 g/mole, in other embodiments less than 1,000,000 g/mole, in other embodiments less than 900,000 g/mole, and in other embodiments less than 800,000 g/mole. In one or more embodiments, useful ethylene-propylene rubbers have a number average molecular weight ($M_n$) that is greater than 20,000 g/mole, in other embodiments greater than 60,000 g/mole, in other embodiments greater than 100,000 g/mole, and in other embodiments greater than 150,000 g/mole; in these or other embodiments, the $M_w$ of the ethylene-propylene rubbers of one or more embodiments is less than 500,000 g/mole, in other embodiments less than 400,000 g/mole, in other embodiments less than 300,000 g/mole, and in other embodiments less than 250,000 g/mole. Techniques for determining the molecular weight ($M_n$, $M_w$ and $M_z$) and molecular weight distribution (MWD) may be found in U.S. Pat. No. 4,540,753 (Cozewith, Ju and Verstrate) and references cited therein and in 21 MACROMOLECULES 3360 (Verstrate et al., 1988).

Another rubber may include an ethylene-based plastomer. In one or more embodiments, the ethylene-based plastomers, which may also be referred to as ethylene-α-olefin copolymers, include copolymers of ethylene and one or more o-olefin comonomers. The α-olefin comonomers may include 1-butene, 1-hexene, 1-octene, 1-nonene, 1-decene, 4-methyl-1-pentene, and mixtures thereof.

In one or more embodiments, the ethylene-α-olefin copolymers may include at least 15 weight percent, in other embodiments at least 30 weight percent, and in other embodiments at least 50 weight percent units deriving from the α-olefin comonomer based upon the total weight of the copolymer. In these or other embodiments, the ethylene-α-olefin copolymers may include less than 55 weight percent, in other embodiments less than 45 weight percent, and in other embodiments less than 40 weight percent units deriving from the α-olefin comonomer based upon the total weight of the copolymer.

In one or more embodiments, the ethylene-α-olefin copolymer may be characterized by a density, as determined at room temperature per ASTM D-792, that is less than 0.900 g/cc, in other embodiments less than 0.870 g/cc, in other embodiments less than 0.865 g/cc, and in other embodiments less than 0.860 g/cc; in these or other embodiments, the ethylene-α-olefin copolymers may be characterized by a density of at least 0.850 g/cc, and in other embodiments at least 0.860 g/cc.

In yet another embodiment, the rubber may include a propylene-based rubbery copolymer. In one or more embodiments, the propylene-based rubbery copolymer, which may also be referred to as propylene-α-olefin copolymers, include units (i.e., mer units) derived from propylene, one or more comonomer units derived from ethylene or α-olefins including from 4 to 20 carbon atoms, and optionally one or more comonomer units derived from dienes. In one or more embodiments, the α-olefin comonomer units may derive from ethylene, 1-butene, 1-hexane, 4-methyl-1-pentene and/or 1-octene. In one or more embodiments, the diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. The embodiments described below are discussed with reference to ethylene as the α-olefin comonomer, but the embodiments are equally applicable to other copolymers with other α-olefin comonomers. In this regard, the copolymer may simply be referred to as propylene-based rubbery copolymers with reference to ethylene as the α-olefin.

In one or more embodiments, the propylene-based rubbery copolymers may include at least 5% by weight, in other embodiments at least 6% by weight, in other embodiments at least 8% by weight, and in other embodiments at least 10% by weight ethylene-derived units; in these or other embodiments, the copolymers may include up to 35% by weight, in other embodiments up to 32% by weight, in other embodiments up to 25% by weight, and in other embodiments up to 20% by weight ethylene-derived units, where the percentage by weight is based upon the total weight of the propylene-derived, α-olefin derived units, and diene-derived units. Stated another way, the propylene-based rubbery copolymers may include at least 75% by weight, or in other embodiments at least 80% by weight, propylene-derived units; and in these or other embodiments, the copolymers may include up to 95% by weight, in other embodiments up to 94% by weight, in other embodiments up to 92% by weight, and in other embodiments up to 90% by weight propylene-derived units, where the percentage by weight is based upon the total weight of the propylene-derived, and diene derived mer units.

In one or more embodiments, the propylene-based rubbery copolymers may include at least 0.5% by weight, in other embodiments at least 1.5% by weight, and in other embodiments at least 3% by weight diene-derived units; in these or other embodiments, the propylene-based rubbery copolymers may include up to 11% by weight, in other embodiments up to 6% by weight, and in other embodiments up to 4% by weight diene-derived units, where the percentage by weight is based upon the total weight of the propylene-derived, ethylene-derived, and diene-derived units.

The propylene-based rubbery copolymers in one or more embodiments of this invention are characterized by having a single melting temperature as determined by differential scanning calorimetry (DSC). The melting point is defined as the temperature of the greatest heat absorption within the range of melting of the sample. The propylene-based rubbery copolymer may show secondary melting peaks adjacent to the principal peak, but for purposes herein, these secondary melting peaks are considered together as a single melting point, with the highest of these peaks being considered the melting point ($T_m$) of the propylene-based rubbery copolymer. In one or more embodiments, the Tof the propylene-based rubbery copolymer is less than 110° C., in other embodiments less than 90° C., in other embodiments less than 80° C., and in other embodiments less than 70° C.; in these or other embodiments, the propylene-based rubbery copolymer has a $T_m$ of at least 25° C., in other embodiments at least of 35° C., in other embodiments at least of 40° C., and in other embodiments at least of 45° C.

In one or more embodiments, the propylene-based rubbery copolymer may be characterized by a heat of fusion (Hf), as determined according to DSC procedures according to ASTM E 793. This may be determined by placing 6 to 10 mg of sample into DSC equipment and heating the sample at 10° C./min. In one or more embodiments, the propylene-based rubbery copolymer may be characterized by a heat of fusion that is at least 0.5 J/g, in other embodiments at least 1.0 J/g, in other embodiments at least 1.5 J/g, in other embodiments at least 3.0, in other embodiments at least 4.0, in other embodiments at least 6.0, and in other embodiments at least 7.0. In these or other embodiments, the propylene-based rubbery copolymer may be characterized by a heat of fusion that of less than 80 J/g, in other embodiments less than 70 J/g, in other embodiments less than 60 J/g, in other embodiments less than 50 J/g, in other embodiments less than 40 J/g, in other embodiments up to 40 J/g, and in other embodiments less than 30 J/g.

The propylene-based rubbery copolymer can have a triad tacticity of three propylene units, as measured by $^{13}C$ NMR, of 75% or greater, 80% or greater, 82% or greater, 85% or greater, or 90% or greater. In one or more embodiments, ranges include from 50 to 99%, in other embodiments from 60 to 99%, in other embodiments from 75 to 99%, in other embodiments from 80 to 99%, and in other embodiments from 60 to 97%. Triad tacticity is determined by the methods described in U.S. Patent Application Publication No. 2004/0236042.

In one or more embodiments, butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include vinyl styrene. Exemplary alkyl substituted vinyl aromatic monomers include a-methyl styrene and paramethyl styrene. These copolymers and terpolymers may also be halogenated such as in the case of chlorinated and brominated butyl rubber. In one or more embodiments, these halogenated polymers may derive from monomer such as parabromomethylstyrene.

In one or more embodiments, butyl rubber includes copolymers of isobutylene and isoprene, and copolymers of isobutylene and paramethyl styrene, terpolymers of isobutylene, isoprene, and divinyl styrene, branched butyl rubber, and brominated copolymers of isobutene and paramethylstyrene (yielding copolymers with parabromomethylstyrenyl mer units). These copolymers and terpolymers may be halogenated.

In one embodiment, where butyl rubber includes the isobutylene-isoprene copolymer, the copolymer may include from 0.5 to 30, or from 0.8 to 5, percent by weight isoprene based on the entire weight of the copolymer with the remainder being isobutylene.

Butyl rubber can be obtained from a number of commercial sources as disclosed in the Rubber World Blue Book. For example, both halogenated and un-halogenated copolymers of isobutylene and isoprene are available under the tradename Exxon Butyl™ (ExxonMobil Chemical Co.), halogenated and un-halogenated copolymers of isobutylene and paramethyl styrene are available under the tradename Exxpro™ (ExxonMobil Chemical Co.), star branched butyl rubbers are available under the tradename Star Branched Butyl™ (ExxonMobil Chemical Co.), and copolymers containing parabromomethylstyrenyl mer units are available under the tradename Exxpro™ 3745 (ExxonMobil Chemical Co.). Halogenated and non-halogenated terpolymers of isobutylene, isoprene, and divinyl styrene are available under the tradename Polysar Butyl™ (Lanxess; Germany).

Any thermoplastic resin that can be employed in the manufacture of thermoplastic vulcanizates of this invention. Useful thermoplastic resins may include solid, generally high molecular weight plastic resins. In one or more embodiments, these thermoplastic resins include un-functionalized resins. In other embodiments, the thermoplastic component of the thermoplastic vulcanizate may include a functionalized thermoplastic resin either alone or in combination with an unfunctionalized resin.

These resins may include crystaline and semi-crystalline polymers. In one or more embodiments, these resins may be characterized by a crystallinity of at least 25% by weight, in other embodiments at least 30% by weight, and in other embodiments at least 35% by weight. Crystallinity may be determined by dividing the heat of fusion of a sample by the heat of fusion of a 100% crystalline polymer, which is assumed to be 209 joules/gram for polypropylene or 350 joules/gram for polyethylene. Where the thermoplastic resin of one or more embodiments is propylene-based, the resins may be characterized by a heat of fusion of at least 50 J/g, in other embodiments in excess of 75 J/g, and in other embodiments in excess of 100 J/g. Where the thermoplastic resins of one or more embodiments are polyethylene-based, they may be characterized by a heat of fusion of at least 85 J/g, in other embodiments at least 100 J/g, and in other embodiments at least 130 J/g.

In one or more embodiments, useful thermoplastic resins may be characterized by an $M_w$ of from 50 to 2,000 kg/mole, and in other embodiments from 100 to 600 kg/mole. They may also be characterized by a $M_n$ of 25 to 1,000 kg/mole, and in other embodiments 50 to 300 kg/mole, as measured by GPC with polystyrene standards.

In one or more embodiments, these thermoplastic resins can have a MFR (ASTM D-1238, 2.16 dg @230° C.) of 0.2 to 5,000 dg/min, in other embodiments from 5 to 500 dg/min, and in other embodiments from 10 to 100 dg/min.

In one ore more embodiments, these thermoplastic resins can have a $T_m$ that is from 110° C. to 250° C., in other embodiments from 155° C. to 170° C., and in other embodiments from 160° C. to 165° C. They may have a $T_g$ of from −10 to 10° C., in other embodiments from −3 to 5° C., and in other embodiments from 0° C. to 2° C. In one or more embodiments, they may have a crystallization temperature ($T_c$) of at least 75° C., in other embodiments at least 95° C., in other embodiments at least 100° C., and in other embodiments at least 105° C., with one embodiment ranging from 105° to 115° C.

Exemplary thermoplastic polymers include crystalline, semi-crystalline, and crystallizable polyolefins, olefin copolymers, and non-olefin resins. The thermoplastic resins may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Specifically included are the reactor, impact, and random copolymers of propylene with ethylene or the higher α-olefins, described above, or with $C_{10}$-$C_{20}$ diolefins. Comonomer contents for these propylene copolymers may be from 1% to 30% by weight of the polymer, for example, See U.S. Pat. No. 6,867,260 B2. Copolymers available under the tradename Vistamaxx™ (ExxonMobil) are specifically included. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers. In a particular embodiment, the thermoplastic is polypropylene, the polypropylene present from 5 to 30 wt % based on the weight of the final thermoplastic vulcanizate.

In one or more embodiments, the thermoplastic vulcanizates may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename Sunpar™ (Sun Chemicals). Others are available under the name Paralux™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from 300 g/mole to 9,000 g/mole, and in other embodiments from 700 g/mole to 1,300 g/mole. In one or more embodiments, these oligomers include isobutenyl mer units. Exemplary synthetic oils include polyisobutylene, poly(isobutylene-co-butene), polybutadiene, poly(butadiene-co-butene), and mixtures thereof. In one or more embodiments, synthetic oils may include polylinear α-olefins, poly-branched α-olefins, hydrogenated polyalphaolefins, and mixtures thereof.

In one or more embodiments, the synthetic oils include synthetic polymers or copolymers having a viscosity in excess of 20 cp, in other embodiments in excess of 100 cp, and in other embodiments in excess of 190 cp, where the viscosity is measured by a Brookfield viscometer according to ASTM D-4402 at 38° C. In these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), Indopol™ (BP; Great Britain), and Parapol™ (ExxonMobil). Oligomeric copolymers deriving from butadiene and its comonomers are commercially available under the tradename Ricon Resin™ (Sartomer). White synthetic oil is available under the tradename Spectrasyn™ (ExxonMobil), formerly SHF Fluids (Mobil) and Elevast™ (ExxonMobil).

In one or more embodiments, the extender oils may include organic esters, alkyl ethers, or combinations thereof. In one or more embodiments, the organic esters and alkyl ether esters may have a molecular weight that is generally less than 10,000. In one or more embodiments, suitable esters include monomeric and oligomeric materials having an average molecular weight of below 2,000 and in other embodiments below 600. In one or more embodiments, the esters may be compatible or miscible with both the polyalphaolefin and rubber components of the composition; i.e., they may mix with other components to form a single phase. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

In certain embodiments, the thermoplastic vulcanizate may include a polymeric processing additive. The processing additive may be a polymeric resin that has a very high melt flow index. These polymeric resins include both linear and branched polymers that have a melt flow rate (230° C./2.16 kg) that is greater than 500 dg/min, more preferably greater than 750 dg/min, even more preferably greater than 1000 dg/min, still more preferably greater than 1200 dg/min, and still more preferably greater than 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers.

In addition to the rubber, thermoplastic resins, and optional processing additives, the thermoplastic vulcanizates of the invention may optionally include reinforcing and non-reinforcing fillers, antioxidants, stabilizers, rubber processing oil, lubricants, anti-blocking agents, anti-static agents, waxes, foaming agents, pigments, flame retardants and other processing aids known in the rubber compounding art. These additives can comprise up to 50 weight percent of the total composition. Fillers and extenders that can be utilized include conventional inorganics such as calcium carbonate, clays, silica, talc, titanium dioxide, carbon black and the like.

In one or more embodiments, the thermoplastic vulcanizates of this invention contain a sufficient amount of the rubber to form rubbery compositions of matter. The skilled artisan will understand that rubbery compositions of matter include those that have ultimate elongations greater than 100 percent, and that quickly retract to 150 percent or less of their original length within 10 minutes after being stretched to 200 percent of their original length and held at 200 percent of their original length for 10 minutes.

Thus, in one or more embodiments, the thermoplastic vulcanizates can include at least 25 percent by weight, in other embodiments at least 45 percent by weight, in other embodiments at least 65 percent by weight, and in other embodiments at least 75 percent by weight rubber. In these or other embodiments, the amount of rubber within the thermoplastic vulcanizates can be from 15 to 90 percent by weight, in other embodiments from 45 to 85 percent by weight, and in other embodiments from 60 to 80 percent by weight, based on the entire weight of the rubber and thermoplastic combined.

In one or more embodiments, the amount of thermoplastic polymer within the thermoplastic vulcanizates can be from 5% to 60% by weight, in other embodiments from 10% to 40% by weight and in other embodiments from 12% to 30%, based on the entire weight of the rubber and thermoplastic combined.

When employed, the thermoplastic vulcanizates may include from 0 to 5 parts by weight, or from 0.1 to 3 parts by weight, or from 0.2 to 2 parts by weight of a polymeric processing additive per 100 parts by weight rubber.

With respect to the oil, the thermoplastic vulcanizate may include from 0 to 250 parts by weight, or from 50 to 150 parts by weight, or from 75 to 130 parts by weight, of extender oil per 100 parts rubber. The quantity of extender oil added depends upon the properties desired, with the upper limit depending upon the compatibility of the particular oil and blend ingredients; this limit is exceeded when excessive exuding of extender oil occurs. The amount of extender oil depends, at least in part, upon the type of rubber. High viscosity rubbers are more highly oil extendable. Stated another way, the oil is blended with the thermoplastic and elastomer at a level of from 40 to 85 wt % based on the weight of the final thermoplastic vulcanizate in one embodiment, and from 50 to 80 wt % based on the weight of the final thermoplastic vulcanizate in another embodiment.

Fillers, such as carbon black, clay, talc, or calcium carbonate may be added in amount from 1 to 250 parts by weight, in other embodiments from 10 to 150 parts by weight, and in other embodiments from 25 to 50 parts by weight, per 100 parts by weight of rubber. The amount of carbon black that can be used may depend, at least in part, upon the type of carbon black and the amount of extender oil that is used.

The cure agent (or "curative") useful in the present invention is directed to peroxide, and more particularly, organic peroxide curatives. Curatives, or curing agents (curative plus coagent(s)) that may be used in the invention for cross-linking, or vulcanizing, the elastomers can be any of those known to those skilled in the art for processing vulcanizable rubber, or more particularly, thermoplastic vulcanizates, including silicon hydrides, phenolic resins, peroxides, free radical initiators, sulfur, zinc metal compounds and the like. The named curatives are frequently used with one or more coagents that serve as initiators, catalysts, etc. for purposes of improving the overall cure state of the rubber. The curatives may be added in one or more locations, including the feed hopper of a melt mixing extruder. For more information see, S. Abdou- Sabet, R. C. Puydak, and C. P. Rader, "Dynamically Vulcanized Thermoplastic Elastomers", 69(3) RUBBER CHEMISTRY AND TECHNOLOGY (July-August 1996), and references cited therein.

Examples of organic peroxides that may be used are di-tert-butyl peroxide, dicumyl peroxide, t-butylcumyl peroxide, alpha-alpha-bis(tert-butylperoxy)diisopropyl benzene, 2,5-dimethyl 2,5-di(t-butylperoxy)hexane, 1,1-di(t-butylperoxy)-3,3,5-trimethyl cyclohexane, n-butyl-4,4-bis(tert-butylperoxy)valerate, benzoylperoxide, lauroyl peroxide, dilauroyl peroxide, 2,5-dimethyl-2,5-di(tert-butylperoxy) hexene-3, and in general, diaryl peroxides, ketone peroxides, peroxydicarbonates, peroxyesters, dialkyl peroxides, hydroperoxides, peroxyketals and combinations thereof. Azo initiators such as Luazo® AP (available from ATO Chemical) may also be used as free radical initiators. The level of peroxide curative in the thermoplastic/rubber melt may be any suitable level that is known in the art, but preferably may range from 0.2 to 5 weight percent based on the weight of the elastomer, thermoplastic and oil that is present.

In addition to the peroxide, other cure adjuvants or coagents can be used. Examples are triallyl cyanurate, triallyl isocyanurate, triallyl phosphate, sulfur, N-phenyl bis-maleamide, zinc diacrylate, zinc dimethacrylate, divinyl benzene, 1,2-polybutadiene, trimethylol propane trimethacrylate, tetramethylene glycol diacrylate, trifunctional acrylic ester, dipentaerythritolpentacrylate, polyfunctional acrylate, polyfunctional methacrylates, acrylate and methacrylate metal salts, and oximer, e.g. quinone dioxime. The level of coagent, when present in the thermoplastic/rubber melt, may be at any suitable level that is known in the art, but preferably may range from 0.2 to 5 weight percent based on the weight of the elastomer, thermoplastic and oil that is present.

In one or more embodiments, the rubber is cured or crosslinked using the organic peroxide by dynamic vulcanization. The term "dynamic vulcanization" refers to a vulcanization or curing process for a rubber contained in a blend with a thermoplastic resin, wherein the rubber is crosslinked or vulcanized under conditions of high shear at a temperature above the melting point of the thermoplastic. In one embodiment, the rubber can be simultaneously crosslinked and dispersed as fine particles within the thermoplastic matrix, although other morphologies may exist also. Dynamic vulcanization can be effected by mixing the thermoplastic elastomer components at elevated temperature in conventional mixing equipment ("melt-blenders") such as roll mills, stabilizers, Banbury mixers, Brabender mixers, continuous mixers, mixing extruders and the like. Multi-step processes can also be employed whereby ingredients, such as the thermoplastic or additional thermoplastic, can be added after dynamic vulcanization has been achieved such as disclosed in PCT/US04/30517.

In another embodiment, the invention includes the use of an apparatus for extruding a thermoplastic vulcanizate, the apparatus and method comprising:
 (a) providing a melt-blender having a die through which melt-blended thermoplastic vulcanizate passes to form a shaped article; wherein the die comprises a flow design having at least one flow branch having a taper angle and a flow reservoir at the end of each flow branch; and wherein the taper angle of the flow design ranges from 5 to 20 degrees;
 (b) melt-blending a thermoplastic and an elastomer with an organic peroxide curative in the melt-blender to form a thermoplastic vulcanizate;
 (c) passing the melt-blended thermoplastic vulcanizate through the flow design to form the shaped article.

EXAMPLES

In the examples and comparative examples herein, either a 1.25" Diamond America extruder ("DA"), or a 1.5" Davis Standard extruder ("DS"), both L/D=10, was used. In all cases outlined in the Tables, various extrusion features are noted, and in examples (numbered) and comparative examples (#C) a 20-40-20-40 screen pack was used in the extruder. In each case the extruder temperature profile in each was Zone1/Zone2/Zone3/Zone4/Gate/Die: 185/190/200/205/205/205° C. The material used in all of the example and comparative extrusions was as follows: TPVs were formed from a blend including 200 phr of EPDM elastomer (EP (VNB) ethylene 63%, 0.7% VNB, by weight, extended with 100 phr Sunpar 150 LW paraffinic oil, Mooney Viscosity ML(1+4) at 125° C.=52 and inherent viscosity in Decalin at 135° C.=4.7), a total of 59 phr of isotactic polypropylene (Sunoco F008F(™)), and a total of 42 phr of clay (39 phr+3 phr with stabilizer mixture, Icecap K clay from Burgess Pigments). Each composition was cured with 6.5 phr of organic peroxide (DHBP-50-WO™ available from Degussa, 2,5-Dimethyl-2,5-di(t-butylperoxy)hexane diluted in 50% white mineral oil) to vulcanize the elastomer. Additional amounts of processing oil (Sunpar 2280 from Sun Oil, paraffinic oil) and zinc oxide (Kodax 911 from Zinc Co.) were added to aid in processing the TPV as shown in Table 1.

The dies used were either an original Bauknecht die having a streamlined flow pattern ("OB"), a revised Bauknecht profile with a 12° taper angle in the flow design ("RB"), or the revised Bauknecht profile with a 12° taper angle in the flow design and having a nickel-teflon coating ("RB—Ni/Tf").

The presence of a "mustache" of material was noted visually, and pictures were also taken at the extrudate outlet from the die front. Also, the surface smoothness of the extrudate was also noted visually.

TABLE 1

| | 1C | 1 | 2 | 3 | 2C |
|---|---|---|---|---|---|
| Parameter | | | | | |
| Extruder | DA | DS | DS | DS | DA |
| Die Temperature (° C.) | 185 to 205 | 185 to 205 | 185 to 205 | 185 to 205 | 185 to 205 |
| Head Pressure, psi | 910 | 640 | 640 | 582 | 360 |
| Die Pressure, psi | 210 | 280 | 280 | 230 | 140 |
| Load, % | 32 | 5.5 | 5.5 | 5.4 | 21 |
| Melt Temp, ° C. | 202 | 199 | 199 | 199 | 199 |
| RPM | 100 | 100 | 100 | 100 | 100 |
| Output, kg/hr | 12.7 | 20 | 20 | 21 | 13 |
| Screw design | 2-stage | Barrier Maddock | Barrier Maddock | Barrier Maddock | 2-stage |
| groove/smooth barrel | Groove | Smooth | Smooth | Smooth | Groove |
| die | OB | RB-Ni/Tf | RB-Ni/Tf | RB | OB |
| Extrudate property | | | | | |
| Mustache | medium | none | none | none | medium |
| surface | smooth | smooth | smooth | smooth | smooth |

TABLE 2

| | 4 | 3C | 5 | 6 | 7 |
|---|---|---|---|---|---|
| Parameter | | | | | |
| Extruder | DS | DA | DS | DS | DS |
| Die | 185 to | 185 to | 185 to | 185 to | 185 to |

TABLE 2-continued

| | 4 | 3C | 5 | 6 | 7 |
|---|---|---|---|---|---|
| Temperature (° C.) | 205 | 205 | 205 | 205 | 205 |
| Head Pressure, psi | 354 | 440 | 351 | 351 | 380 |
| Die Pressure, psi | 280 | 170 | 130 | 130 | 190 |
| Load, % | 3.2 | 23 | 3.8 | 3.8 | 3.3 |
| Melt Temp, ° C. | 202 | 199 | 199 | 199 | 199 |
| RPM | 100 | 100 | 100 | 100 | 100 |
| Output, kg/hr | 24.2 | 13.1 | 20.7 | 20.7 | 20.6 |
| | Barrier Maddock | 2-stage | Barrier Maddock | Barrier Maddock | Barrier Maddock |
| groove/smooth barrel | smooth | smooth | smooth | smooth | groove |
| die | RB-Ni/Tf | RB-Ni/Tf | RB-Ni/Tf | RB | RB-Ni/Tf |
| Extrudate property | | | | | |
| Mustache | light to none | medium | none | none | light to none |
| surface | smooth | smooth | smooth | smooth | smooth |

We claim:

1. A method for extruding a thermoplastic vulcanizate, the method comprising:
   (a) providing a smooth barrel extruder having a die plate comprising a flow design having at least one flow branch having a taper angle and a flow reservoir at the end of each flow branch, where the die plate includes a back surface facing a melt blender and a front surface opposite thereto; and wherein the taper angle of the flow design ranges from 5 to 20 degrees, where the flow reservoir is the same size as the end of the flow branch at the front surface of the die and where the flow reservoir is larger in size than the end of the flow branch at the back surface of the die;
   (b) in the smooth barrel extruder, melt-blending a thermoplastic vulcanizate comprising:
      an elastomer and a thermoplastic with organic peroxide to form a thermoplastic vulcanizate;
   (c) passing the melt-blended thermoplastic vulcanizate through the flow design to form a shaped article,
   wherein no die lip build-up is observed at the face of the die.

2. The method of claim 1, wherein the die is coated with a passivating layer from 10 to 500 μm thickness.

3. The method of claim 1, wherein the taper angle of the die design ranges from 8 to 16 degrees.

4. The method of claim 1, wherein the taper angle of the die design ranges from 8 to 16 degrees.

5. The method of claim 1, wherein the die is at a temperature of from 185 to 205° C.

6. The method of claim 1, wherein the melt-blender is a smooth barrel extruder.

7. The method of claim 1, wherein oil is blended with the thermoplastic and elastomer at a level of from 40 to 85 wt % based on the weight of the final thermoplastic vulcanizate.

8. The method of claim 1, wherein the thermoplastic is polypropylene, the polypropylene present from 5 to 30 wt % based on the weight of the final thermoplastic vulcanizate.

9. The method of claim 1, wherein the elastomer is ethylene-propylene-diene rubber and is present from 10 to 50 wt % based on the weight of the final thermoplastic vulcanizate.

10. A method of extruding a thermoplastic vulcanizate, the method comprising:
    (i) providing a thermoplastic vulcanizate including a peroxide-cured elastomer dispersed within a thermoplastic matrix;
    (ii) melt processing the thermoplastic vulcanizate within a melt blender to form a molten thermoplastic vulcanizate;
    (iii) extruding the molten thermoplastic vulcanizate through a flow design in a die plate, where the die plate includes a back surface facing the melt blender and a front surface opposite thereto, where the flow design includes at least one flow branch having a flow reservoir at the end of each flow branch, where the at least one flow branch has a taper angle from 5 to 20 degrees, where the flow branch is continuous from the back surface of the die to the front surface of the die, and where the flow reservoir is continuous from the back surface of the die to the front surface of the die and is larger in size at the back surface of the die relative to its size at the front side of the die, thereby allowing a greater volume of molten thermoplastic vulcanizate to flow into the flow reservoir relative to the other portions of the flow design, where the flow reservoir is the same size as the end of the flow branch at the front surface of the die and where the flow reservoir is larger in size than the end of the flow branch at the back surface of the die.

11. The method of claim 10, where said step of extruding forms an extrudate that exits the die at the front surface of the die.

12. The method of claim 11, where no die lip build up is observed at the face of the die.

13. The method of claim 10, wherein the die is at a temperature of from 185 to 205° C.

14. The method of claim 10, wherein the melt-blender is a smooth barrel extruder.

15. The method of claim 10, wherein oil is blended with the thermoplastic and elastomer at a level of from 40 to 85 wt % based on the weight of the final thermoplastic vulcanizate.

16. The method of claim 15, wherein the thermoplastic is polypropylene, the polypropylene present from 5 to 30 wt % based on the weight of the final thermoplastic vulcanizate.

17. The method of claim 15, wherein the elastomer is ethylene-propylene-diene rubber and is present from 10 to 50 wt % based on the weight of the final thermoplastic vulcanizate.

18. The method of claim 10, wherein the die is coated with a passivating layer from 10 to 500 μm thickness.

19. The method of claim 10, wherein the output of thermoplastic vulcanizate melt from the die ranges from 15 to 30 kg/hr.

* * * * *